(12) United States Patent
Lee et al.

(10) Patent No.: US 11,379,044 B2
(45) Date of Patent: Jul. 5, 2022

(54) ADAPTIVE HAPTIC SIGNAL GENERATING DEVICE AND METHOD THEREOF

(71) Applicant: DONG WOON ANATECH CO., LTD, Seoul (KR)

(72) Inventors: Jeonghoon Lee, Yongin-si (KR); Inwoo Han, Seoul (KR); Kwangsung Jung, Gunpo-si (KR)

(73) Assignee: DONG WOON ANATECH CO., LTD, Seoul (KR)

( * ) Notice: Subject to any disclaimer, the term of this patent is extended or adjusted under 35 U.S.C. 154(b) by 0 days.

(21) Appl. No.: 17/185,921

(22) Filed: Feb. 25, 2021

(65) Prior Publication Data

US 2021/0181851 A1 Jun. 17, 2021

Related U.S. Application Data

(63) Continuation of application No. PCT/KR2020/002423, filed on Feb. 19, 2020.

(30) Foreign Application Priority Data

Feb. 19, 2019 (KR) .......................... 10-2019-0019157

(51) Int. Cl.
  *G06F 3/01* (2006.01)
  *G06F 3/16* (2006.01)

(52) U.S. Cl.
  CPC ................ *G06F 3/016* (2013.01); *G06F 3/16* (2013.01)

(58) Field of Classification Search
  CPC ........... G05B 2219/40553; G06F 3/016; G06F 3/04886; B60W 50/16; F15B 13/14; H01H 13/85
  See application file for complete search history.

(56) References Cited

U.S. PATENT DOCUMENTS 9,354,704 B2    5/2016  Lacroix et al.
9,466,288 B2 *  10/2016 Zhang .................... G10L 25/48
(Continued)

FOREIGN PATENT DOCUMENTS

KR    20090130833 A    12/2009
KR    20130090299 A    8/2013
(Continued)

OTHER PUBLICATIONS

International Search Report issued in PCT/KR2020/002423; dated Jul. 9, 2020.

*Primary Examiner* — William Lu
(74) *Attorney, Agent, or Firm* — Studebaker & Brackett PC

(57) ABSTRACT

The present invention relates to an adaptive haptic signal generating device, which includes: a frequency analysis unit converting and analyzing a received audio signal into a frequency domain; a frequency equalizer unit suppressing or amplifying a specific frequency interval of the audio signal converted into the frequency domain; a haptic event extraction unit extracting a haptic event signal corresponding to a case of a specific threshold or more in the suppressed or amplified frequency domain; a haptic signal generation unit generating a haptic signal corresponding to the haptic event signal; and a control unit counting the number of generation times of the extracted haptic event signal for each frequency, and increasing a frequency gain of a frequency corresponding to a haptic event signal which is generated at a predetermined number of times or more.

9 Claims, 4 Drawing Sheets

(56) References Cited

U.S. PATENT DOCUMENTS

| | | | | |
|---|---|---|---|---|
| 9,520,036 B1* | 12/2016 | Buuck | ............... | G08B 6/00 |
| 10,045,110 B2* | 8/2018 | Razouane | ............... | G10L 17/22 |
| 10,353,467 B2* | 7/2019 | Augenbergs | ............ | G06F 1/169 |
| 10,521,015 B2* | 12/2019 | Yliaho | ............... | H01H 13/85 |
| 10,572,020 B2* | 2/2020 | Shah | ............... | G06F 3/016 |
| 10,643,595 B2* | 5/2020 | Macours | ............... | G08B 6/00 |
| 10,649,532 B2* | 5/2020 | Cruz-Hernandez | ..... | G06F 3/016 |
| 10,732,714 B2* | 8/2020 | Rao | ............... | G06F 3/044 |
| 10,917,704 B1* | 2/2021 | Hamid | ............... | G06N 3/0445 |
| 2011/0075835 A1* | 3/2011 | Hill | ............... | G06F 3/016 |
| | | | | 379/418 |
| 2011/0215913 A1* | 9/2011 | Ullrich | ............... | G08B 6/00 |
| | | | | 340/407.1 |
| 2011/0293103 A1* | 12/2011 | Park | ............... | G10K 11/17823 |
| | | | | 381/57 |
| 2012/0206247 A1* | 8/2012 | Bhatia | ............... | G06F 3/167 |
| | | | | 340/407.1 |
| 2015/0063575 A1* | 3/2015 | Tan | ............... | G06F 16/683 |
| | | | | 381/56 |
| 2016/0117051 A1* | 4/2016 | Han | ............... | G06F 3/04166 |
| | | | | 345/173 |
| 2017/0357317 A1* | 12/2017 | Chaudhri | ............... | G06F 3/016 |
| 2019/0154439 A1* | 5/2019 | Binder | ............... | G01S 13/878 |
| 2019/0250200 A1* | 8/2019 | Cada | ............... | G01R 31/01 |

FOREIGN PATENT DOCUMENTS

| | | |
|---|---|---|
| KR | 20160012704 A | 2/2016 |
| KR | 101666393 B1 | 10/2016 |
| KR | 101899538 B1 | 9/2018 |

* cited by examiner

ADAPTIVE HAPTIC SIGNAL GENERATING DEVICE AND METHOD THEREOF

CROSS-REFERENCE TO RELATED APPLICATIONS

The present application is a continuation of International Patent Application No. PCT/KR2020/002423, filed on Feb. 19, 2020, which is based upon and claims the benefit of priority to Korean Patent Application No. 10-2019-0019157, filed on Feb. 19, 2019. The disclosures of the above-listed applications are hereby incorporated by reference herein in their entirety.

TECHNICAL FIELD

The present invention relates to an adaptive haptic signal generating device, and more particularly, to an adaptive haptic signal generating device which can increase a hit rate capable of generating a haptic signal desired by a user when an audio signal is converted into a haptic signal in real time regardless of types of various audio input contents.

BACKGROUND ART

Products that support haptic technology enable more realism and immersion by adding tactile information to users. However, in order to implement the haptic technology using contents that does not contain tactile information in the related art, a vibration pattern should be planted in the corresponding contents in advance for a specific time and purpose when playing the contents, so a lot of time, effort, and cost are required. In order to solve this problem, there is a need for a haptic technology that automatically converts the audio signal into the haptic signal when there is an existing audio signal.

When the existing technology is described, most representatively, in a case where the audio signal is converted into the haptic signal, the audio signal is analyzed in a time domain or a frequency domain and a signal concentrated on a specific region is drawn up by using a filter and the signal is connected to haptic. In this case, since the existing technology is an algorithm that simply converts sound into haptic, all sound events cannot but be connected to a haptic event.

Further, since it is true that the types of contents given as an input are various and it is difficult to specify the types, there cannot but be a limit in raising the hit rate by the existing method. Therefore, when an audio signal which is not predetermined is converted into the haptic signal, there is a still a limit in raising the hit rate desired by the user and there is still a problem in that contents have different setting values.

As Prior Art 1, U.S. Pat. No. 9,354,704 (Low-frequency Effects Haptic Conversion System) is a technology that provides the haptic signal to the user, and then receives a user adjustment for a haptic effect parameter to adjust the haptic signal. Prior Art 1 as a scheme in which the user modifies the haptic effect parameter by inputting the adjustment has inconvenience that the user should perform an operation manually.

DISCLOSURE

Technical Problem

Accordingly, a first object to be solved by the present invention is to provide an adaptive haptic signal generating device which can increase a hit rate capable of generating a haptic signal desired by a user when an audio signal is converted into a haptic signal in real time regardless of types of various audio input contents.

A second object to be solved by the present invention is to provide an adaptive haptic signal generating method which can generate the haptic signal by adaptively setting different thresholds according to unique magnitudes of received audio signals.

Further, another object is to provide a computer readable recording medium having a program for executing the method in a computer recorded therein.

Technical Solution

In order to achieve the first object, the present invention provides an adaptive haptic signal generating device which includes: a frequency analysis unit converting and analyzing a received audio signal into a frequency domain; a frequency equalizer unit suppressing or amplifying a specific frequency interval of the audio signal converted into the frequency domain; a haptic event extraction unit extracting a haptic event signal corresponding to a case of a specific threshold or more in the suppressed or amplified frequency domain; a haptic signal generation unit generating a haptic signal corresponding to the haptic event signal; and a control unit counting the number of generation times of the extracted haptic event signal for each frequency, and increasing a frequency gain of a frequency corresponding to a haptic event signal which is generated at a predetermined number of times or more as a result of the counting.

Further, the control unit may increase the specific threshold when the haptic event signal is generated at the predetermined number of times or more as the result of counting the number of generation times of the haptic event signal.

According to an embodiment of the present invention, an adaptive haptic signal generating device may be provided, which includes: a filter unit filtering a specific frequency interval of a received audio signal; an amplifier unit suppressing or amplifying the filtered audio signal; a haptic event extraction unit extracting a haptic event signal corresponding to a case of a specific threshold or more in the audio signal suppressed or amplified by the amplifier unit; a haptic signal generation unit generating a haptic signal corresponding to the haptic event signal; and a control unit counting the number of generation times of the extracted haptic event signal, and increasing an amplification gain of a frequency corresponding to a haptic event signal which is generated at a predetermined number of times or more as a result of the counting.

In order to achieve the second object, the present invention may provide an adaptive haptic signal generating method which includes: converting and analyzing a received audio signal into a frequency domain; suppressing or amplifying a specific frequency interval of the audio signal converted into the frequency domain; extracting a haptic event signal corresponding to a case of a specific threshold or more in the suppressed or amplified frequency domain; and generating a haptic signal corresponding to the haptic event signal, and further includes: counting the number of generation times of the extracted haptic event signal for each frequency; and increasing a frequency gain of a frequency corresponding to a haptic event signal which is generated at a predetermined number of times or more as a result of counting the number of generation times of the haptic event signal.

Further, the adaptive haptic signal generating method may further include increasing the specific threshold when the haptic event signal is generated at the predetermined number of times or more as the result of counting the number of generation times of the haptic event signal.

According to an embodiment of the present invention, an adaptive haptic signal generating method may be provided, which includes: filtering a specific frequency interval of a received audio signal; suppressing or amplifying the filtered audio signal; extracting a haptic event signal corresponding to a case of a specific threshold or more in the suppressed or amplified audio signal; and generating a haptic signal corresponding to the haptic event signal, and further includes: counting the number of generation times of the extracted haptic event signal for each frequency; and increasing an amplification gain of a frequency corresponding to a haptic event signal which is generated at a predetermined number of times or more as a result of counting the number of generation times of the haptic event signal.

In order to solve the other technical object, the present invention provides a computer readable recording medium having a program for executing the adaptive haptic signal generating method in a computer, which is recorded therein.

Advantageous Effects

According to the present invention, it is possible to increase a hit rate capable of generating a haptic signal desired by a user when an audio signal is converted into a haptic signal in real time regardless of types of various audio input contents.

Further, according to the present invention, it is possible to generate the haptic signal by adaptively setting different thresholds according to unique magnitudes of received audio signals.

Furthermore, according to the present invention, it is possible to increase a generation rate of a haptic signal desired by a user while suppressing generation of an undesired haptic signal.

BEST MODE

Figure 1:
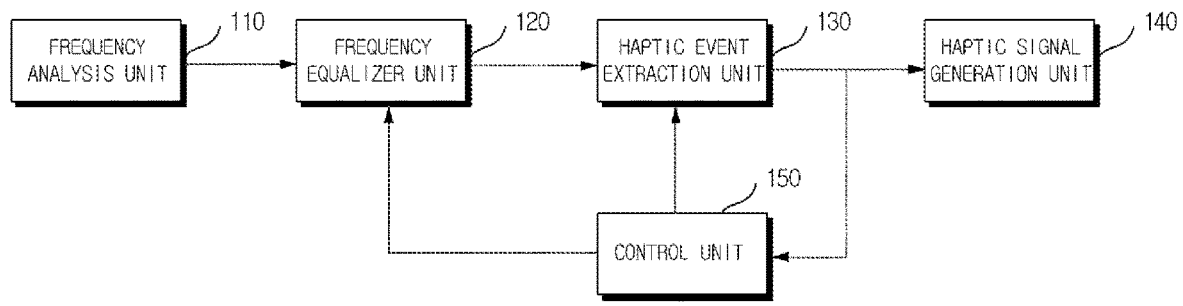
FIG. 1 is a configuration diagram of an adaptive haptic signal generating device according to a preferred embodiment of the present invention.

Hereinafter, preferred embodiments of the present invention will be described in detail in which those skilled in the art can easily implement the present invention, with reference to the accompanying drawings. However, the embodiments are used for more specifically describing the present invention and it will be apparent to those skilled in the art that the scope of the present invention is not limited thereto.

The configuration of the present invention for clarifying a solution to the problem to be solved by the present invention will be described in detail with reference to the accompanying drawings based on a preferred embodiment of the present invention, but it has been described in advance that in assigning reference numerals to the components of the drawings, the same reference numerals are assigned to the same components even though the same components are on different drawings and components of other drawings may be cited if necessary in describing the corresponding drawings. In addition, when it is determined that detailed descriptions of known functions or configurations related to the present invention and other matters may unnecessarily obscure the subject matter of the present invention in describing the operating principle of the preferred embodiment of the present invention in detail, the detailed descriptions will be omitted.

FIG. 1 is a configuration diagram of an adaptive haptic signal generating device according to a preferred embodiment of the present invention.

Referring to FIG. 1, the adaptive haptic signal generating device according to the embodiment is constituted by a frequency analysis unit 110, a frequency equalizer unit 120, a haptic event extraction unit 130, a haptic signal generation unit 140, and a control unit 150.

The frequency analysis unit 110 converts and analyzes a received audio signal into a frequency domain. When the audio signal is converted into the frequency domain, the audio signal may be converted for each frequency band by using faster Fourier transform (FFT).

The frequency equalizer 120 suppresses or amplifies a specific frequency interval of the audio signal converted to the frequency domain.

The frequency equalizer unit 120 may also include a low pass filter that cuts out a low pass and a high pass filter that cuts out a high pass, a band pass filter that removes only a specific frequency and passes the remaining parts as they are, and a band reject filter that selects and removes only the specific frequency, and may combine and use the filters.

The haptic event extraction unit 130 extracts a haptic event signal corresponding to a case of a specific threshold or more in the suppressed or amplified frequency domain.

The haptic event signal may be extracted by considering at least one of an intensity, a pitch, a rhythm, energy, a temporal contrast, a melody, a harmony, and a timbre of the received audio signal.

The haptic signal generation unit 140 generates a haptic signal corresponding to the haptic event signal.

As an embodiment, by pitch-shifting the audio signal, an original pitch of the audio signal may be shifted to a target pitch within a target pitch range of a haptic output device such as an actuator. Further, by shifting the original pitch of the audio signal to the target pitch, one or more original frequencies of the audio signal may be shifted to one or more target frequencies.

The control unit 150 counts the number of generation times of the haptic event signal extracted from the haptic event extraction unit 130 for each frequency, and increases a frequency gain of a frequency corresponding to a haptic event signal which is generated at a predetermined number of times or more as a result of the counting.

When the control unit 150 counts the number of generation times of the haptic event signal for each frequency, the number of generation times of the haptic event signal may be excluded from the counting in a case where the magnitude of power corresponding to the corresponding frequency is equal to or less than a predetermined magnitude.

Meanwhile, according to the counting result, other frequencies other than the frequency corresponding to the haptic event signal which is generated at a predetermined number of times or more may be suppressed.

When the haptic event signal is generated at a predetermined number of times or more as the result of counting the number of generation times of the haptic event signal extracted from the haptic event extraction unit 130, the control unit 150 may increase a specific threshold of the haptic event extraction unit 130. When the specific threshold is increased, there is an effect that a generation frequency of the haptic signal is lowered.

Further, the control unit 150 may divide a specific frequency interval of the frequency equalizer unit 120 more minutely by analyzing the frequency corresponding to the haptic event signal which is generated at the predetermined number of generation times or more. For example, when an initially set specific frequency interval is 200 to 1500 Hz, if the frequency in which the haptic event signal is generated is 400 Hz, 600 Hz, 700 Hz, 800 Hz, and 1200 Hz, the specific frequency interval is preferably limited to 400 to 1200 Hz.

The control unit 150 extracts the haptic event signal from the received audio signal in real time, increases an amplification gain of a frequency corresponding to the extracted haptic event signal, and decreases amplification gains of the other frequencies to generate the haptic signal adaptively according to characteristics of the audio signal.

Manual tuning required for the frequency analysis unit 110 and the haptic event extraction unit 130 may be automated through the control unit 150 to some extent. Further, this case basically has an output having a higher hit rate than a case where a frequency for an audio signal having a specific frequency is high, such as a game.

Since the audio signal exists in various forms in real life, it is actually impossible to specify a specific form. Therefore, the received audio signal is adaptively learned and a haptic event hit rate may be enhanced by controlling the control unit 150 that analyzes audio according to a learning result.

Figure 2:
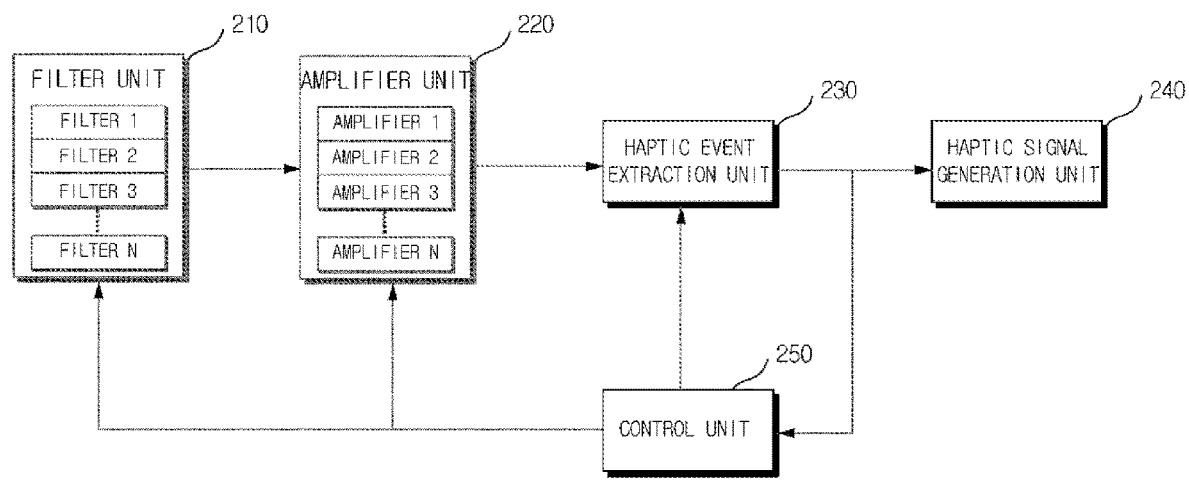
FIG. 2 is a configuration diagram of an adaptive haptic signal generating device according to another preferred embodiment of the present invention.

FIG. 2 is a configuration diagram of an adaptive haptic signal generating device according to another preferred embodiment of the present invention.

Referring to FIG. 2, the adaptive haptic signal generating device according to the embodiment is constituted by a filter unit 210, an amplifier unit 220, a haptic event extraction unit 230, a haptic signal generation unit 240, and a control unit 250.

The filter unit 210 filters a specific frequency interval of a received audio signal.

The filter unit 210 is constituted by N filters including filter 1 to filter N to constitute a filter bank. Each filter is preferably configured by a band pass filter that filters a predetermined frequency band. The frequency band of each filter may be interval-changed by control of the control unit 250 and the amplification gain of the filter may be changed. If necessary, it is preferable to suppress a low pass frequency with heavy noise.

The amplifier unit 220 suppresses or amplifies the filtered audio signal.

The amplifier unit 220 is constituted by N amplifiers including amplifier 1 to amplifier N to constitute an amplifier bank. Each amplifier corresponds to each filter of the filter unit 210, and amplifies or suppresses a signal received from the corresponding filter and outputs the amplified or suppressed signal to the haptic event extraction unit 230.

A gain of each amplifier amplified or suppressed by the amplifier unit 220 is changed by the control of the control unit 250.

The haptic event extraction unit 230 extracts a haptic event signal corresponding to a case of a specific threshold or more in the audio signal suppressed or amplified in the amplifier unit 220.

The haptic event signal may be extracted by considering at least one of an intensity, a pitch, a rhythm, energy, a temporal contrast, a melody, a harmony, and a timbre of the received audio signal.

The haptic signal generation unit 240 generates a haptic signal corresponding to the haptic event signal.

As an embodiment, by pitch-shifting the audio signal, an original pitch of the audio signal may be shifted to a target pitch within a target pitch range of a haptic output device such as an actuator. Further, by shifting the original pitch of the audio signal to the target pitch, one or more original frequencies of the audio signal may be shifted to one or more target frequencies.

The control unit 250 counts the number of generation times of the extracted haptic event signal for each frequency, and increases an amplification gain of a frequency corresponding to a haptic event signal which is generated at a predetermined number of times or more as a result of the counting.

When the control unit 250 counts the number of generation times of the haptic event signal for each frequency, the number of generation times of the haptic event signal may be excluded from the counting in a case where the magnitude of power corresponding to the corresponding frequency is equal to or less than a predetermined magnitude.

When the haptic event signal is generated at a predetermined number of times or more as the result of counting the number of generation times of the haptic event signal extracted from the haptic event extraction unit 230, the control unit 250 may increase a specific threshold of the haptic event extraction unit 230.

Further, the control unit 250 may divide a specific frequency interval of the filter unit 210 more minutely by analyzing the frequency corresponding to the haptic event signal which is generated at the predetermined number of generation times or more. For example, when an initially set frequency interval of filter 3 is 1000 to 1500 Hz, if the frequency in which the haptic event signal is generated is 1100 Hz, 1150 Hz, 1180 Hz, and 1200 Hz, the specific frequency interval may be limited to 1100 to 1200 Hz.

Figure 3:
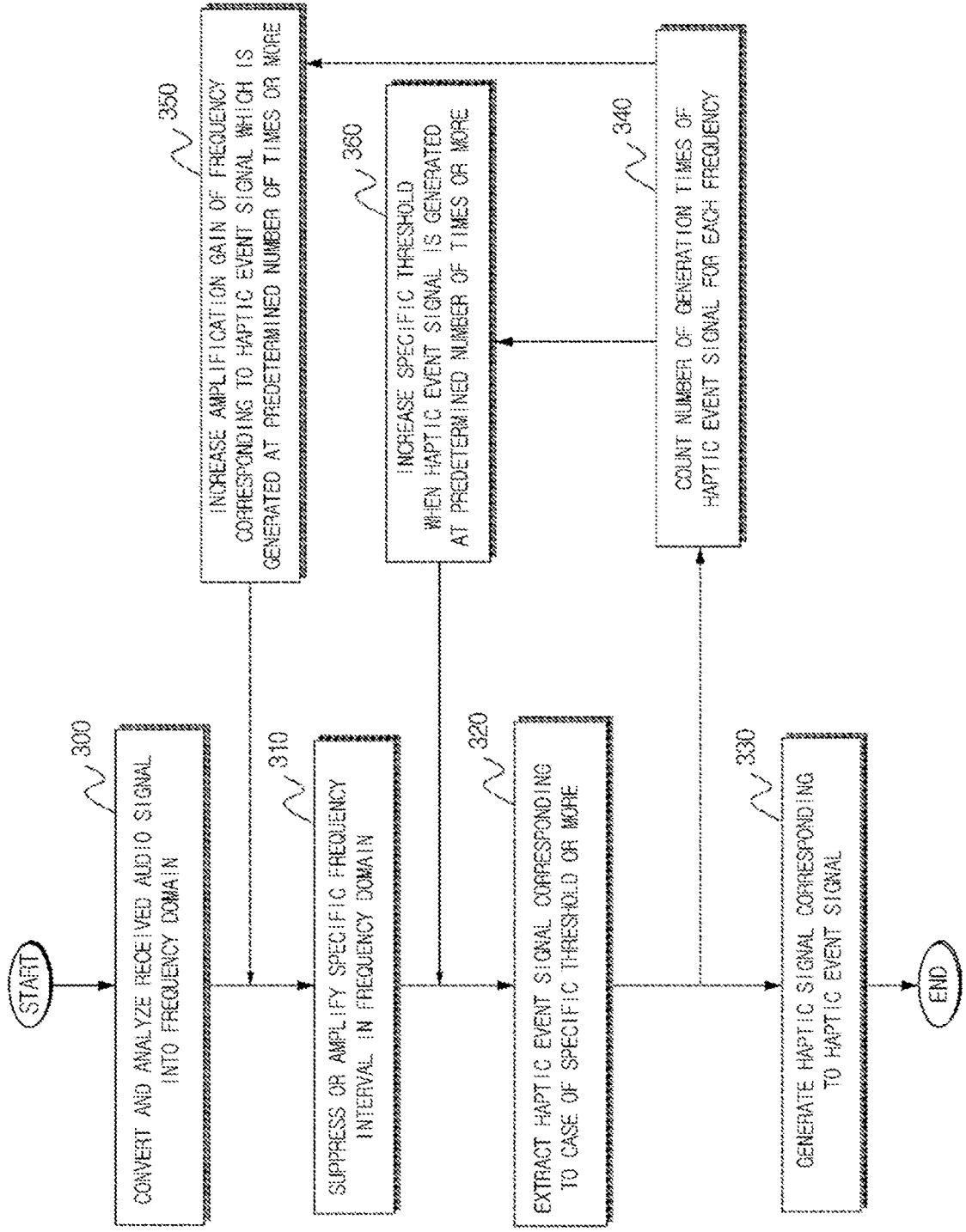
FIG. 3 is a flowchart of an adaptive haptic signal generating method according to a preferred embodiment of the present invention.

FIG. 3 is a flowchart of an adaptive haptic signal generating method according to a preferred embodiment of the present invention.

Referring to FIG. 3, the adaptive haptic signal generating method according to the embodiment is constituted by steps that are processed by the haptic signal generating device illustrated in FIG. 1 in time series. Therefore, in spite of contents omitted below, contents described above regarding the adaptive haptic signal generating device illustrated in FIG. 1 are applied even to the adaptive haptic signal generating method according to the embodiment.

In step 300, the adaptive haptic signal generating device converts and analyzes a received audio signal into a frequency domain.

In step 310, the adaptive haptic signal generating device suppresses or amplifies a specific frequency interval of the audio signal converted to the frequency domain.

In step 320, the adaptive haptic signal generating device extracts a haptic event signal corresponding to a case of a specific threshold or more in the suppressed or amplified frequency domain.

In step 330, the adaptive haptic signal generating device generates a haptic signal corresponding to the haptic event signal.

In step 340, the adaptive haptic signal generating device counts the number of generation times of the haptic event signal extracted in step 320 for each frequency.

In step 350, the adaptive haptic signal generating device increases a frequency gain of a frequency corresponding to a haptic event signal which is generated at a predetermined number of times or more as a result of counting the number of generation times of the haptic event signal in step 340. The increased frequency gain is used for amplifying the specific frequency interval in step 310.

In the adaptive signal generating method according to an embodiment of the present invention, when the haptic event signal is output through initial setting, a frequency value and a magnitude of a signal corresponding to the corresponding haptic event signal are stored, and when the haptic event signal is continuously generated in a specific frequency value or a specific frequency band, a signal in the corresponding specific frequency value or band is strengthened or other frequency values or bands are suppressed, thereby increasing the hit rate of the haptic signal.

In step 360, the adaptive haptic signal generating device increases the specific threshold used in step 320 when the haptic event signal is generated at the predetermined number of generation times or more as the result of counting the number of generation times of the haptic event signal in step 340.

As an embodiment, when the haptic event signal generated in step 340 is generated at the predetermined number of times or more and it is determined that the haptic event signal is too frequently generated, it is preferable to increase a specific threshold for converting the audio signal into the haptic signal. As another embodiment, the generation rate of the haptic signal may be adjusted by adjusting the specific threshold for converting the audio signal into the haptic signal adaptively according to the magnitude of the received audio signal.

Figure 4:
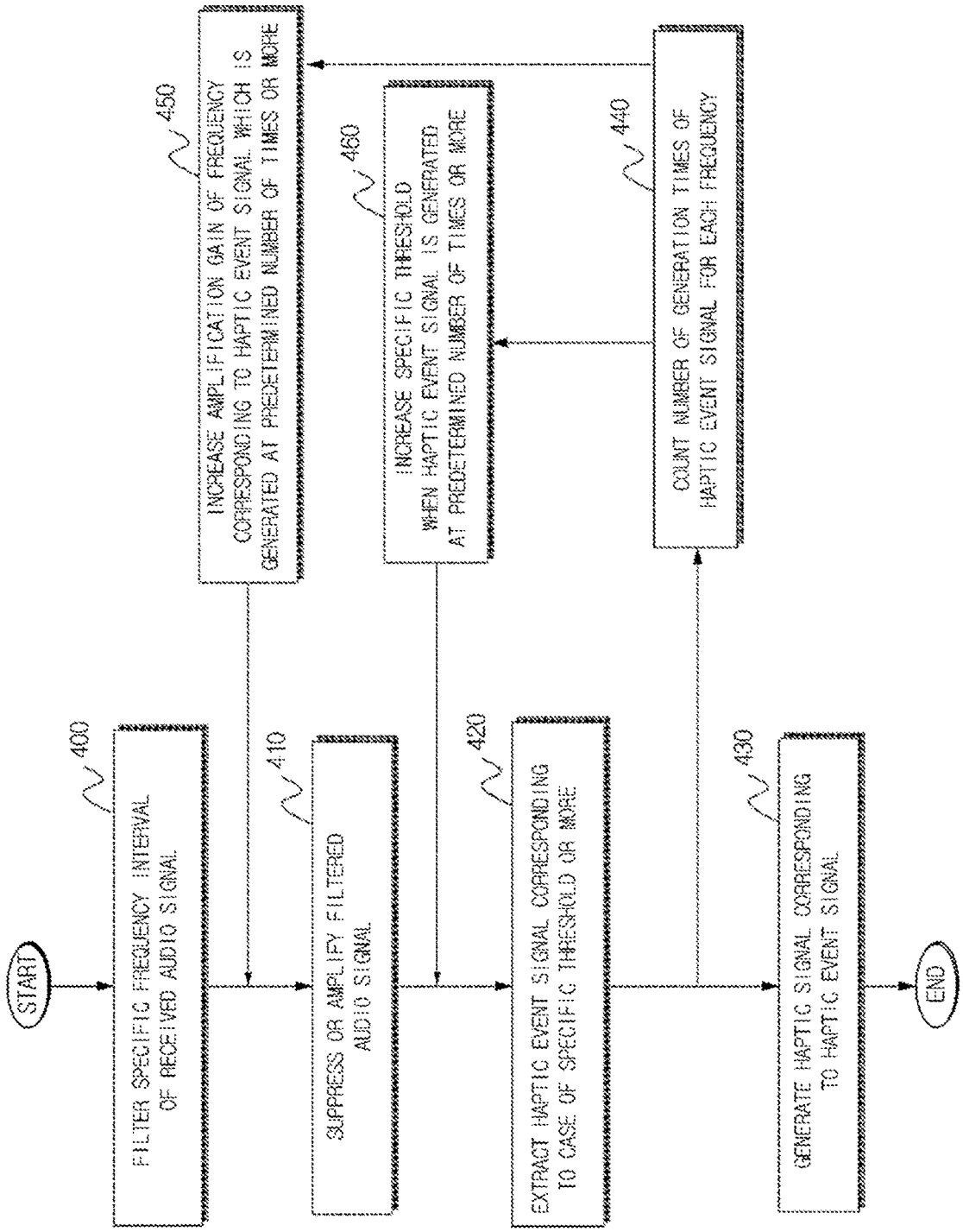
FIG. 4 is a flowchart of an adaptive haptic signal generating method according to another preferred embodiment of the present invention.

FIG. 4 is a flowchart of an adaptive haptic signal generating method according to another preferred embodiment of the present invention.

Referring to FIG. 4, the adaptive haptic signal generating method according to the embodiment is constituted by steps that are processed by the haptic signal generating device illustrated in FIG. 2 in time series. Therefore, in spite of contents omitted below, contents described above regarding the adaptive haptic signal generating device illustrated in FIG. 2 are applied even to the adaptive haptic signal generating method according to the embodiment.

In step 400, the adaptive haptic signal generating device filters a specific frequency interval of a received audio signal.

In step 410, the adaptive haptic signal generating device suppresses or amplifies the filtered audio signal.

In step 420, the adaptive haptic signal generating device extracts a haptic event signal corresponding to a case of a specific threshold or more in the suppressed or amplified audio signal.

In step 430, the adaptive haptic signal generating device generates a haptic signal corresponding to the haptic event signal.

In step 440, the adaptive haptic signal generating device counts the number of generation times of the extracted haptic event signal for each frequency.

In step 450, the adaptive haptic signal generating device increases an amplification gain of a frequency corresponding to a haptic event signal which is generated at a predetermined number of times or more as a result of counting the number of generation times of the haptic event signal in step 440. The increased amplification gain is used for amplifying an amplification of a specific frequency in step 410.

In the adaptive haptic signal generating method according to an embodiment of the present invention, when the haptic event signal is output through initial setting, a frequency value and a magnitude of a signal corresponding to the corresponding haptic event signal are stored, and when the haptic event signal is continuously generated in a specific frequency value or a specific frequency band, a signal in the corresponding specific frequency value or band is strengthened or other frequency values or bands are suppressed, thereby increasing the hit rate of the haptic signal.

In step 460, the adaptive haptic signal generating device increases the specific threshold used in step 420 when the haptic event signal is generated at the predetermined number of generation times or more as the result of counting the number of generation times of the haptic event signal in step 440.

As an embodiment, when the haptic event signal generated in step 340 is generated at the predetermined number of times or more and it is determined that the haptic event signal is too frequently generated, it is preferable to increase a specific threshold for converting the audio signal into the haptic signal. As another embodiment, the generation rate of the haptic signal may be adjusted by adjusting the specific threshold for converting the audio signal into the haptic signal adaptively according to the magnitude of the received audio signal.

The device and the method for generating the adaptive haptic signal illustrated in FIGS. 1 to 4 have a feedback system that learns given audio contents and reflects the learning result and feeds back the reflected learning result as a final haptic output to more minutely handle a domain of sound on which a persons intends to concentrate. Further, the present invention basically has an effect of operating in a form in which a difference in performance is not different at the beginning, but a hit rate of performance gradually increases as a learned result value is output.

Figure 5:
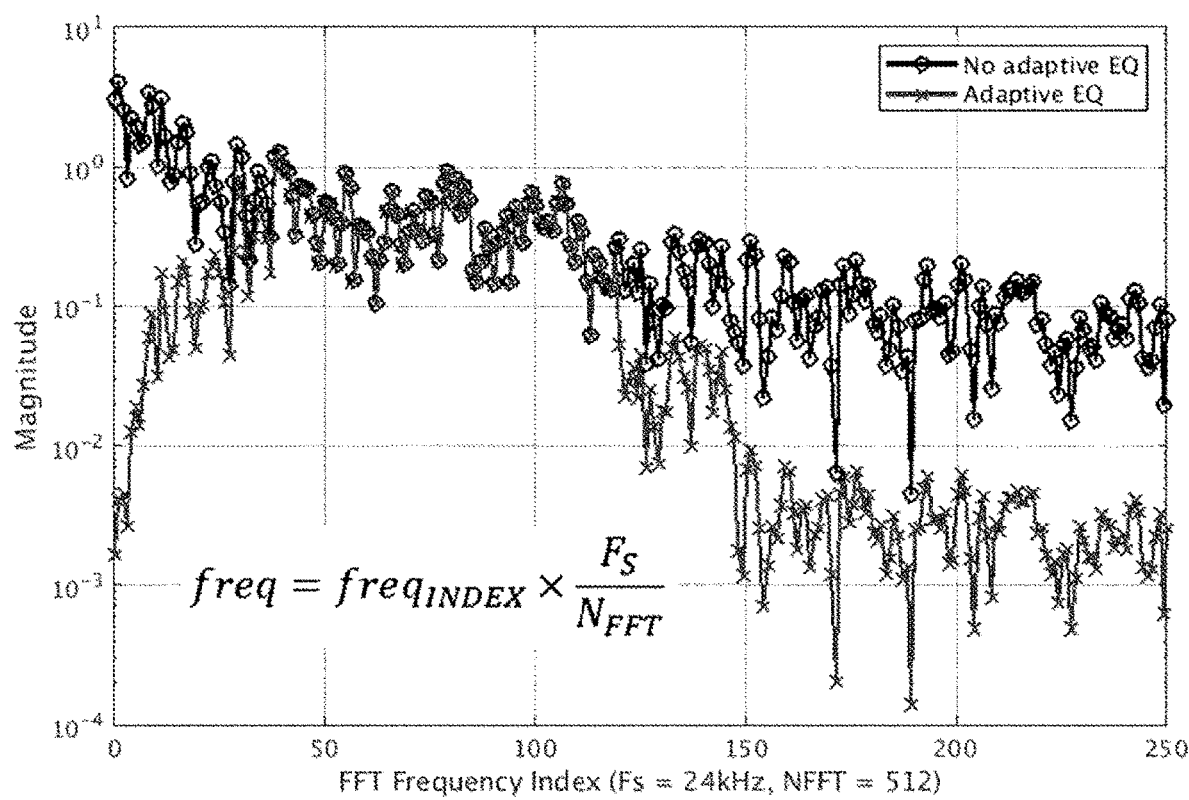
FIG. 5 illustrates a case where a specific frequency interval is suppressed in a frequency domain according to an embodiment of the present invention.

FIG. 5 illustrates a case where a specific frequency interval is suppressed in a frequency domain according to an embodiment of the present invention.

An X axis of a graph illustrated in FIG. 5 represents a frequency index and a Y axis represents a size of a log scale corresponding to the frequency index.

The frequency analysis unit 110 of FIG. 1 may convert the audio signal for each frequency band by using faster Fourier transform (FFT) at the time of converting the received audio signal into the frequency domain.

In this case, the frequency analysis unit 110 contains sampled input data in a buffer, and then outputs the input data in order to perform the FFT and when the number of input data contained in the buffer is represented by $N_{FFT}$ and a sampling frequency is represented by $F_s$, a relationship between the frequency index and the frequency may be calculated as follows.

$$\text{Frequency} = \text{Frequency index} * F_s/N_{FFT} \qquad \text{[Equation 1]}$$

Here, the frequency index may be determined as sampling frequency/2.

In FIG. 5, when $F_s$=24 kHz and $N_{FFT}$ is 512, the magnitude corresponding to each frequency index is calculated as the log scale.

The frequency equalizer 120 according to the present invention is fed back with a gain from the control unit 150 and the gain is maintained to be the same as the previous gain in the range of approximately 2 to 5.6 kHz (corresponding to a frequency index of approximately 40 to 120) and a frequency magnitude is suppressed for the remaining frequency interval.

Meanwhile, as another embodiment, the gain of the frequency is increased in the range of approximately 2 to 5.6 kHz in FIG. 5 and the gain is decreased for other frequency intervals, thereby more clearly distinguishing a specific frequency interval than other frequency intervals.

The embodiments of the present invention are implemented in a form of a program command which may be performed through various computer means and may be recorded in the computer readable medium. The computer readable medium may include singly or combinationally a program command, a data file, or a data structure or a combination thereof. The program command recorded in the medium may be specially designed and configured for the present invention, or may be publicly known to and used by those skilled in the computer software field. An example of the computer readable recording medium includes magnetic media, such as a hard disk, a floppy disk, and a magnetic tape, optical media such as a CD-ROM and a DVD, magneto-optical media such as a floptical disk, and all types of hardware devices such as a ROM, a RAM, and a flash memory, which are specially configured to store and execute the program command. An example of the program command includes a high-level language code executable by a computer by using an interpreter and the like, as well as a machine language code created by a compiler. The hardware device may be configured to be operated with one or more software modules in order to perform the operation of the present invention and vice versa.

As described above, the present invention has been described by specified matters such as detailed components, and the like and limited embodiments and drawings, but the description is just provided to assist more overall understanding of the present invention and the present invention is not limited to the embodiment and various modifications and changes can be made by those skilled in the art from such a disclosure.

Accordingly, the spirit of the present invention should not be defined only by the described embodiments, and it should be appreciated that claims to be described below and all which are equivalent to the claims or equivalently modified are included in the scope of the present invention.

The invention claimed is:

1. An adaptive haptic signal generating device comprising:
   a frequency analysis unit converting and analyzing a received audio signal into a frequency domain;
   a frequency equalizer unit suppressing or amplifying a specific frequency interval of the audio signal converted into the frequency domain;
   a haptic event extraction unit extracting a haptic event signal corresponding to a case of a specific threshold or more in the suppressed or amplified frequency domain;
   a haptic signal generation unit generating a haptic signal corresponding to the haptic event signal; and
   a control unit
      counting a number of generations of the extracted haptic event signal,
      identifying the number of generations of the extracted haptic event signal for each frequency corresponding to the extracted haptic event signal,
      detecting a particular frequency having the identified number of generations, which is equal to or higher than a predetermined number, and
      increasing a frequency gain of the detected particular frequency.

2. The adaptive haptic signal generating device of claim 1, wherein the control unit increases the specific threshold when the haptic event signal is generated at the predetermined number of times or more as the result of counting the number of generation times of the haptic event signal.

3. The adaptive haptic signal generating device of claim 1, wherein the control unit increases the specific threshold of the haptic event extraction unit when the number of generations of the extracted haptic event signal is equal to or higher than a predetermined generation number.

4. The adaptive haptic signal generating device of claim 1, wherein the control unit limits the specific frequency interval of the frequency equalizer unit, to exclude frequencies that do not correspond to frequencies in which haptic event signals are generated.

5. An adaptive haptic signal generating device comprising:
   a filter unit filtering a specific frequency interval of a received audio signal;
   an amplifier unit suppressing or amplifying the filtered audio signal;
   a haptic event extraction unit extracting a haptic event signal corresponding to a case of a specific threshold or more in the audio signal suppressed or amplified by the amplifier unit;
   a haptic signal generation unit generating a haptic signal corresponding to the haptic event signal; and
   a control unit
      counting a number of generations of the extracted haptic event signal,
      identifying the number of generations of the extracted haptic event signal for each frequency corresponding to the extracted haptic event signal,
      detecting a particular frequency having the identified number of generations, which is equal to or higher than a predetermined number, and
      increasing an amplification gain of the detected particular frequency.

6. An adaptive haptic signal generating method comprising:
   converting and analyzing a received audio signal into a frequency domain;
   suppressing or amplifying a specific frequency interval of the audio signal converted into the frequency domain;
   extracting a haptic event signal corresponding to a case of a specific threshold or more in the suppressed or amplified frequency domain; and
   generating a haptic signal corresponding to the haptic event signal, and further comprising:
   counting a number of generations of the extracted haptic event signal;
   identifying the number of generations of the extracted haptic event signal for each frequency corresponding to the extracted haptic event signal;
   detecting a particular frequency having the identified number of generations, which is equal to or higher than a predetermined number; and
   increasing a frequency gain of the detected particular frequency.

7. The adaptive haptic signal generating method of claim 6, further comprising:
   increasing the specific threshold when the haptic event signal is generated at the predetermined number of times or more as the result of counting the number of generation times of the haptic event signal.

8. An adaptive haptic signal generating method comprising:
   filtering a specific frequency interval of a received audio signal;
   suppressing or amplifying the filtered audio signal;
   extracting a haptic event signal corresponding to a case of a specific threshold or more in the suppressed or amplified audio signal; and
   generating a haptic signal corresponding to the haptic event signal, and further comprising:
   counting a number of generations of the extracted haptic event signal;
   identifying the number of generations of the extracted haptic event signal for each frequency corresponding to the extracted haptic event signal;
   detecting a particular frequency having the identified number of generations, which is equal to or higher than a predetermined number; and
   increasing an amplification gain of the detected particular frequency.

9. A computer readable recording medium having a program for executing the method of claim 6 in a computer, which is recorded therein.

* * * * *